C. M. LUFKIN.
Harvester.

No. 18,173.  
Patented Sept. 8, 1857.

UNITED STATES PATENT OFFICE.

C. M. LUFKIN, OF ACWORTH, NEW HAMPSHIRE, ASSIGNOR TO NORRIS LUFKIN.

IMPROVEMENT IN HARVESTERS.

Specification forming part of Letters Patent No. 18,173, dated September 8, 1857.

*To all whom it may concern:*

Be it known that I, C. M. LUFKIN, of Acworth, in the county of Sullivan and State of New Hampshire, have invented certain new and useful Improvements in Harvesters; and I do hereby declare that the following is a full, clear, and exact description of the same, reference being had to the annexed drawings, making a part of this specification, in which—

Figure 1:
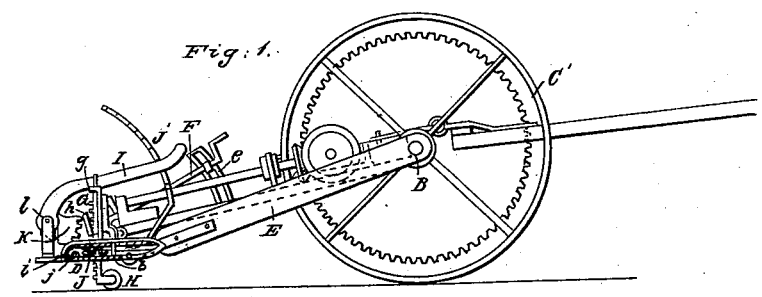
Figure 2:
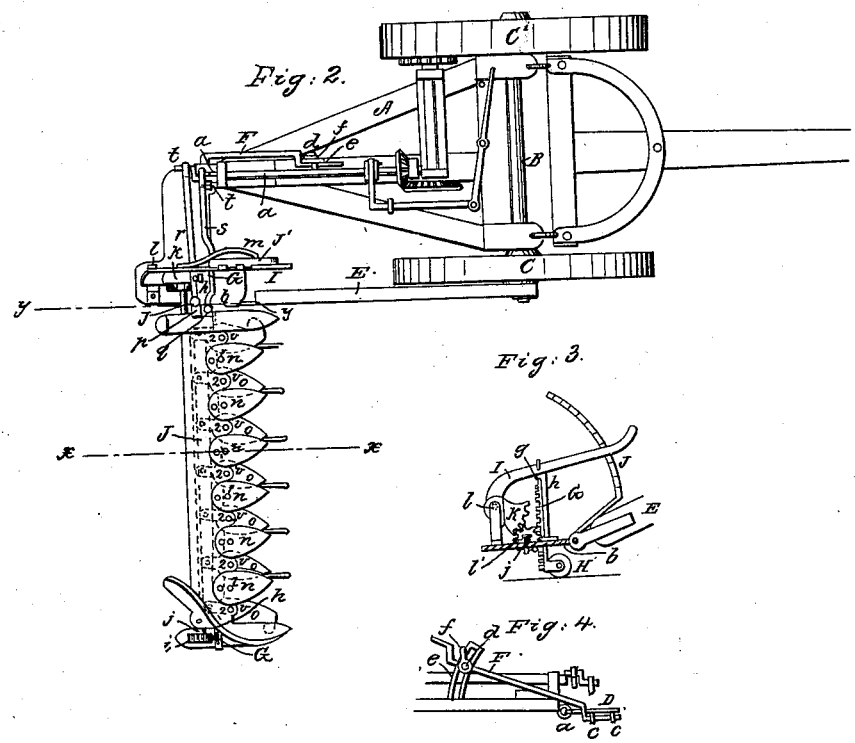
Figure 3:
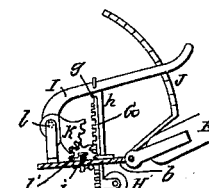
Figure 4:
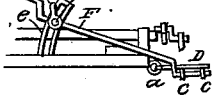

Figure 1 is a transverse section of my improvement, taken in the line $x\,x$, Fig. 2. Fig. 2 is a plan or top view of same. Fig. 3 is a transverse section of the finger-bar, taken in the line $y\,y$, and showing the device by which the finger-bar is raised and lowered. Fig. 4 is a detached side view of the device by which the ends of the cutters of the sickle may be elevated or depressed.

Similar letters of reference indicate corresponding parts in the several figures.

This invention consists in a peculiar arrangement of the cutting device, whereby the same is effectually prevented from clogging.

To enable those skilled in the art to make and use my invention, I will proceed to describe it.

A represents the main frame of the harvester, which is of V form, its larger end being fitted loosely on the axle B of two wheels, C C'.

To the pointed or back end of the frame A the finger-bar D is attached, said bar being attached to the end of the frame A by means of a hook, $a$, which passes loosely through the bar A, and is allowed to swing freely thereon. (See Fig. 4.) A hook, $b$, also passes through the finger-bar D some distance from the hook $a$. The hook $b$ is attached to a bar, E, which is fitted loosely on one end of the axle B.

To the end of the bar D, and near the hook $a$, a rod, F, is attached, said rod being fitted loosely at one end in eyes $c\,c$ at the under side of the finger-bar. This rod F has a screw, $d$, fitted to its opposite end, and said screw passes through a slot in an upright, $e$, on the frame A, and has a nut, $f$, on it. By raising or lowering the end of the rod F the finger-bar D may be placed more or less angularly with the surface of the ground, and the bar may be secured in the desired position by screwing the nut $f$ up against the upright $e$. By this means the points of the cutters may be more or less inclined, as circumstances require.

If the ground is quite rough and stony, the points of the cutters and fingers should be elevated so that the under surfaces of the cutters and fingers, as the machine moves along, will strike the obstructions, the points being so that the fingers above may readily slide over them. If, however, the ground is smooth, the points of the cutters and fingers may be depressed and be in a horizontal position.

G G represent two vertical racks, which are fitted in guides, $g$, attached to uprights $h\,h$ on the finger-bar. In the lower end of each rack G a wheel, H, is placed, said wheels resting upon the ground. In each rack G a pinion, $i$, gears, and these pinions are attached to a shaft, $j$, which is just above the finger-bar D. The pinion on the inner end of the shaft $j$ gears into a geared sector, $k$, which is attached to the lower arm of a bent lever, I, which has its fulcrum at $l$. The upper end of this lever traverses over a segment-rack, J', attached to the finger-bar, and is retained in said rack at any desired point by a spring, $m$, attached to the lever I. By raising or lowering the upper end of lever I the finger-bar D and sickle may be adjusted bodily the requisite height, so that the sickle may cut the grass or grain the desired distance from the surface of the ground.

The sickle is formed of two sets of cutters, $n\,o$. These cutters are pivoted to the finger-bar D, as shown at 1 2, Fig. 2, the cutters working on said pivots, which serve as fulcrums. The inner ends of the cutters are attached to bars $p\,q$, which are connected by rods $r\,s$ to reverse cranks $t\,t$ on the driving-shaft $u$, which receives its motion by means of suitable gearing from the wheel C'. The inner ends of the cutters $n$ are of semicircular form and concentric with their pivots 1, and the semicircular ends are "let into" a plate, J, which is secured on the finger-bar D. The cutters $o$, it will be understood, are below the cutters $n$, the two sets of cutters working one over the other, similar to shears. The plate J between the upper set of cutters, $n$, is rounded, or made of semicircular form, as shown at $v$, the rounded parts $v$ being concentric with the pivots 2 of the cutters $o$. The plate J is flush with the cutters $n$. By this arrangement the cut grass or grain cannot choke or clog the cutting device, as there is no place or crevice in which it can be caught, and it passes freely over the cutters and plate J.

I am aware that two series or sets of cutters working one set over the other like shears have been previously used, and I therefore do not claim cutters thus arranged; but,

Having thus described my invention, what I do claim as new, and desire to secure by Letters Patent, is—

The combination of the cutters $n$ and $o$ with the peculiarly-constructed plate J, arranged and operating in the manner and for the purpose above set forth.

C. M. LUFKIN.

Witnesses:
    DAVID MONTGOMERY,
    EMMA HOLMES.